Patented June 14, 1949

2,473,110

UNITED STATES PATENT OFFICE 2,473,110

PREPARATION OF COLLOIDAL TRISULFIDE OF ARSENIC

Fernando F. Schwartz, Santiago, Chile

No Drawing. Application September 15, 1947, Serial No. 774,185

1 Claim. (Cl. 252—313)

Colloidal trisulphide of arsenic is very sensible to the action of electrolytes. For this reason its employment for practical purposes is difficult, and its preparation in a stabilized non-precipitatable form has drawbacks. The present invention deals with a novel method of preparating a colloidal trisulphide of arsenic which is slightly sensible to the action of electrolytes.

I discovered that the stability of colloidal trisulphide of arsenic formed by the reaction between ammonium sulpharsenate and formaldehyde is perfect if colloidal sulphur, previously prepared by a similar reaction, is used as a protecting colloid. In order to produce this special protecting colloid I use ammonium polysulphide and formaldehyde in the presence of an ordinary protector such as ammonium caseinate.

Colloidal trisulphide of arsenic thus prepared has an extraordinary stability, it keeps indefinitely and weak electrolytes such as sea water have no destructive action thereon. The formation of colloidal trisulphide of arsenic with these stability characteristics is not possible without the employment of colloidal sulphur as protecting colloid. Any other protecting colloid, even in the case of its being employed in great excess to favour the stability in the aforesaid reaction does not prevent a rapid coagulation of the product obtained.

The process of preparing colloidal trisulphide of arsenic according to the present invention is illustrated by the following example:

10 kg. of ammonium polysulphide with 30% of sulphur in solution are mixed with 10 kg. of a protecting colloid such as, for example, an ammonium caseinate solution with 12% of casein. A 30% solution of formaldehyde is added to said mixture, stirring rapidly until all the ammonia present is transformed into hexamethylene-tetramine. Colloidal sulphur thus obtained serves as a protecting colloid for the preparation of colloidal trisulphide of arsenic. This latter substance is obtained by mixing 25 kg. of ammonium sulpharsenate containing 9% of arsenic, with an equal quantity of the colloidal sulphur previously obtained, and then proceeding to the decomposition of the sulpho-arsenical complex by fixing its basic radical by means of stirring with a 30% solution of formaldehyde, using the amount necessary for the complete neutralization of the product.

The proportions and figures given in the above example of the preparation of colloidal trisulphide of arsenic are indicated by way of reference only. It is to be understood that operating with products of different concentration and proportions similar products may be obtained, the invention being only limited by the scope of the following claim.

What I claim is:

A method of preparing a stable colloidal trisulphide of arsenic consisting of admixing ammonium sulpharsenate with about an equal quantity of colloidal sulphur, and treating this mixture with a sufficient amount of about a 30% formaldehyde solution to fix the ammonia radical of the sulpharsenate compound to produce a colloidal arsenic trisulphide stabilized with colloidal sulphur.

FERNANDO F. SCHWARTZ.

REFERENCES CITED

The following references are of record in the file of this patent:

UNITED STATES PATENTS

| Number | Name | Date |
|---|---|---|
| 1,007,682 | Ellis | Nov. 7, 1911 |
| 1,422,945 | Edwards | July 18, 1922 |
| 2,439,147 | Schwartz | Apr. 6, 1948 |

FOREIGN PATENTS

| Number | Country | Date |
|---|---|---|
| 222,268 | Great Britain | Oct. 2, 1924 |